Aug. 20, 1968   R. C. NODDIN ET AL   3,398,353
MAGNETO SYSTEMS
Filed July 2, 1965   4 Sheets-Sheet 1
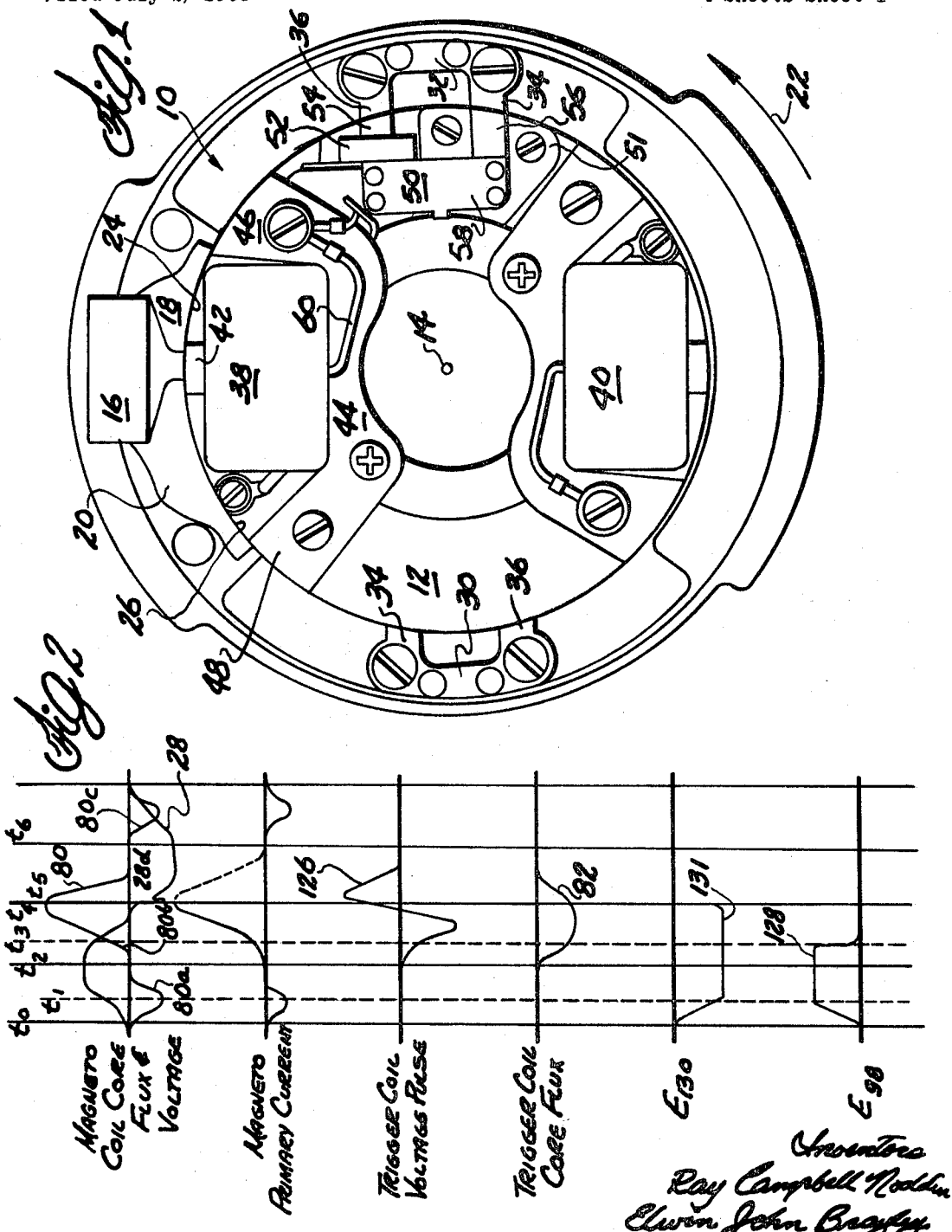

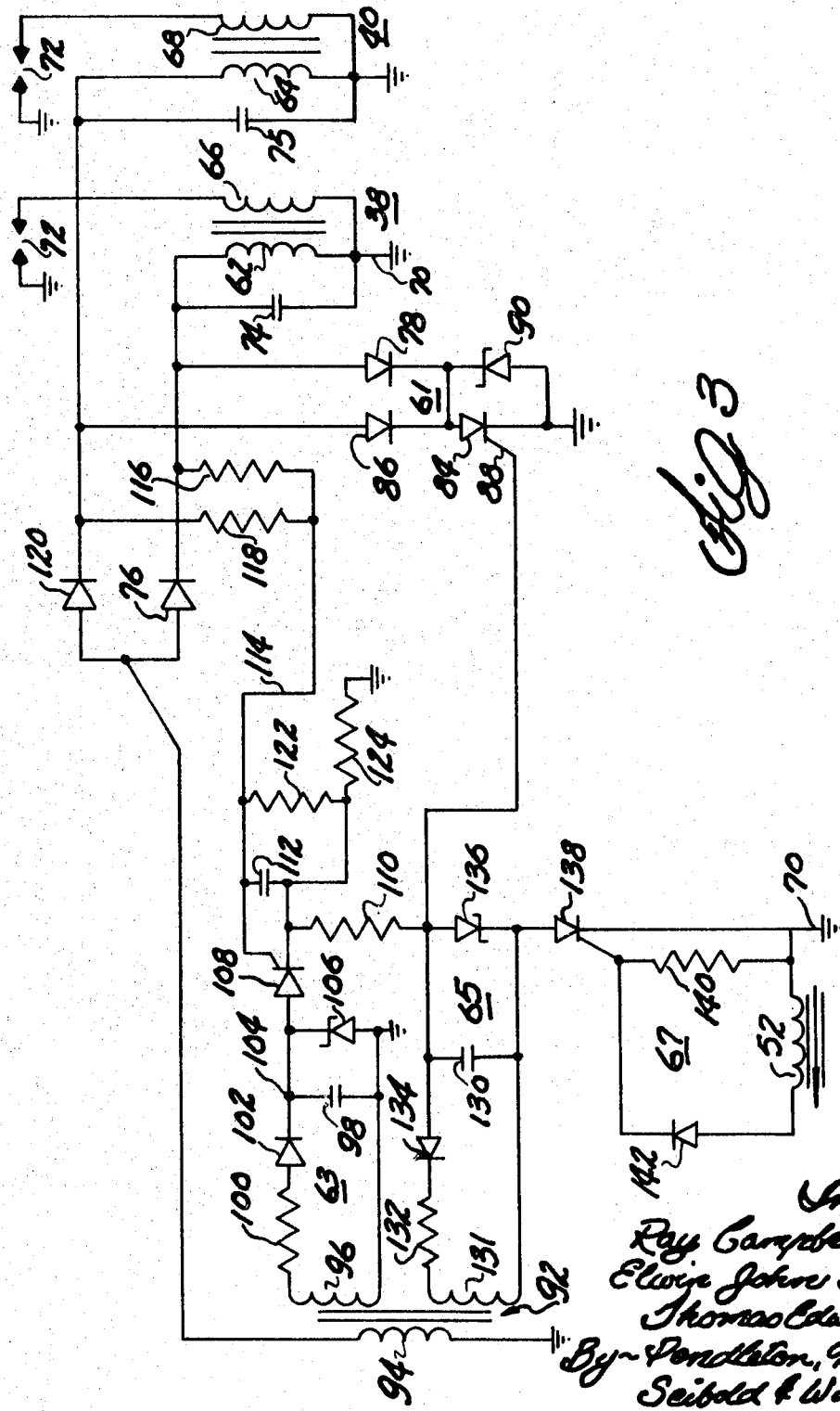

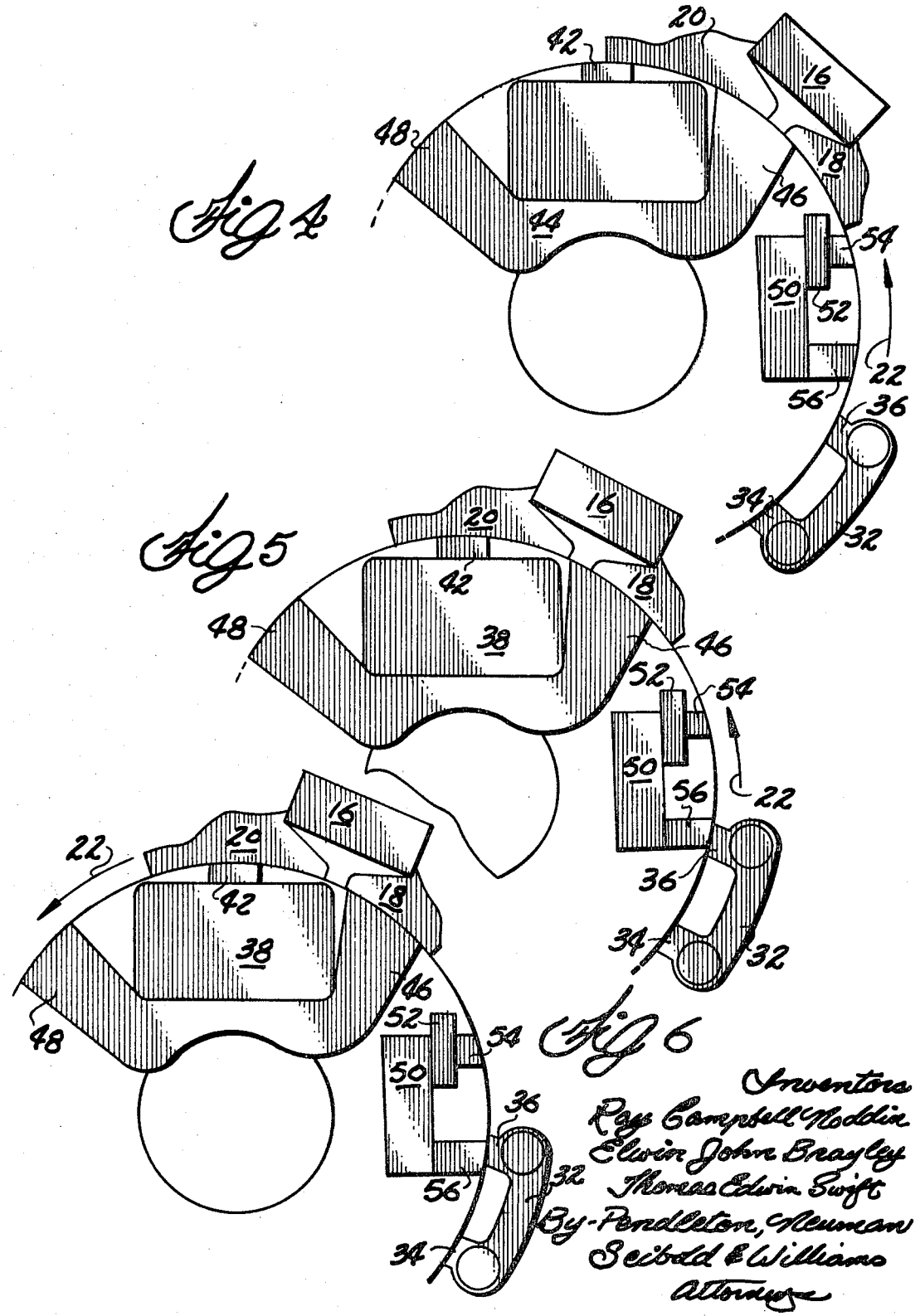

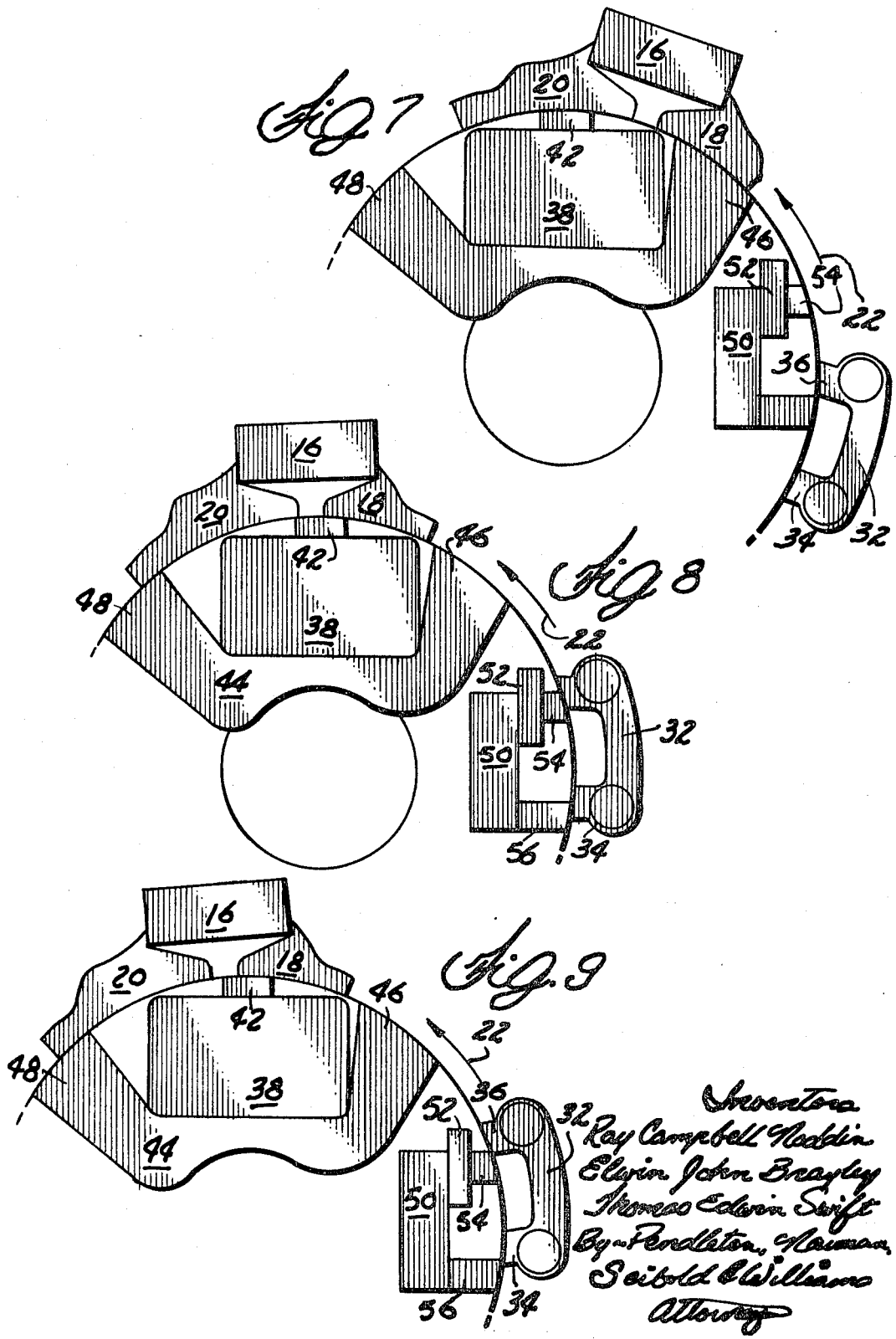

United States Patent Office 3,398,353
Patented Aug. 20, 1968

3,398,353
MAGNETO SYSTEMS
Ray Campbell Noddin, Chicopee, Elwin John Brayley, East Longmeadow, and Thomas Edwin Swift, West Springfield, Mass., assignors to Globe-Union Inc., Milwaukee, Wis., a corporation of Delaware
Filed July 2, 1965, Ser. No. 469,078
15 Claims. (Cl. 322—17)

ABSTRACT OF THE DISCLOSURE

An improved flywheel magneto system and especially one having enhanced reliability by virtue of the use of solid state threshold devices and magnetoeletric triggering thereof and a unique control system including energy storage devices for controlling the conductivity of the solid state threshold devices. The invention provides a solid state magneto system which is free of moving parts other than the rotating flywhel. There are no cams or rubbing surfaces which can wear or become improperly adjusted. The threshold device acts as a controllable shunt for magneto current and can be rapidly rendered nonconductive to produce a steep transient voltage for fuel ignition purposes. A unique triggering system is provided which utilizes so-called "Maverick" signals which were heretofore considered undesirable and were suppressed.

This invention relates to improved magneto systems and, more particularly, to an improved magnetoelectric system for generating large voltage impulses for use in ignition systems and the like.

As used herein, "magneto" means any magnetoelectric device employing two relatively moving magnetic elements, the movement of which is utilized to generate useful electrical energy. The use of magnetos in industry has extended over a long period of time and magneto ignition systems are common in automotive applications, aircraft and marine engines, portable equipment and other gasoline-powered machinery. One widely used flywheel magneto is that illustrated in Brownlee Patent No. 2,583,466. The magneto descibed therein includes a flywheel or rotor which houses a magnet and armature assembly and a stator which supports a coil and core assembly and breaker points. The basic mechanical relationships shown in Brownlee Patent No. 2,583,466 may be employed in constructing magneto systems in accordance with the instant invention. However, the particular construction and the mode of operation are strikingly different in the instant invention and rely upon novel magnetoelectric principles and unique cooperation between a new combination of magnetoelectric elements.

It is one object of this invention to provide an improved flywheel magneto system having enhanced reliablity by virtue of the use of solid-state threshold devices and magnetoelectric triggering thereof.

It is another object of this invention to provide an improved flywheel magneto system which is stable during its normal useful life and free of variations in engine timing at a given engine speed which have resulted heretofore from wear and deterioration of the conventional mechanical and electrical components.

It is still another object of this invention to provide an improved flywheel magneto system characterized by an improved secondary output wave form and enhanced ignition voltage characteristics.

Other objects of the invention include the provision of a simplified mechanical system for a flywheel magneto and the provision of solid state and magnetoelectric means for controlling ignition and adjusting engine timing for various engine speeds.

Further and additional objects of this invention will become manifest from a consideration of this description, the accompanying drawings and the appended claims.

In one form of this invention a pair of ignition windings are directly connected to two corresponding spark plugs of a two-cylinder engine. Each ignition winding has associated therewith a first winding which is connected through a solid state threshold device to ground. The associated circuitry includes a trigger coil assembly which senses motion of the flywheel and terminates conduction in the threshold device at precisely controlled predetermined times in the magnetoelectric cycle.

For a more complete understanding of this invention, reference will now be made to the accompanying drawings wherein:

FIG. 1 is a partial plan view of the rotor and stator of one embodiment of this invention;

FIG. 2 is a family of curves representing various electrical and magnetic phenomena as a function of time;

FIG. 3 is a circuit diagram of the embodiment of FIG. 1;

FIGS. 4 through 9 are a sequence of diagrammatic sketches illustrating the operation of the embodiment of FIG. 1 at the particular times set forth in FIG. 2.

The magneto structure

Referring now to the drawings, and more particularly to FIG. 1, a flywheel magneto bearing some mechanical similarity to the magneto shown in Brownlee Patent No. 2,583,466 is illustrated, and the teaching of that patent with respect to the mechanical mounting of parts may be helpful in more fully understanding and practicing the instant invention. A portion of the flywheel has been omitted in FIG. 1, but the magnetoelectric portions thereof are included and comprise an annular flywheel 10 which includes certain magnetic armatures and a stator 12 having cooperating magnetic cores and coils. The rotor 10 is rotatable with substantial precision around the axis 14 of stator 12. A magneto magnet 16 is secured within the rotor 10 and has a pair of armature poles 18 and 20 associated therewith. The rotor is designed to rotate in the direction indicated by arrow 22 at a speed synchronized with the speed of an associated engine. While the poles 18 and 20 may have similar or identical configurations and define similar or identical pole faces 24 and 26, in the instant embodiment the leading pole 20 is substantially enlarged and has a face 26 which extends over an extended angular segment of the rotor. This variation in the shape of the pole does not alter the basic operation of the magneto but changes the rate at which initial magnetic flux builds up within the magnetic circuit and thus affects the flux curve 28 of FIG. 2.

A pair of diametrically opposed trigger armatures 30 and 32 have a pair of poles 34 and 36 which define faces forming a part of the internal annular surface of rotor 12. The armatures described above cooperate with magneto windings and a trigger coil disposed on stator 12 in a manner to be described.

The particular embodiment disclosed in FIG. 1 includes two magneto winding assemblies 38 and 40, each of which includes a first and a second magneto coil mounted on the central leg 42 of a core 44. The core 44 also includes a forward leg 46 and a last leg 48. The central leg 42 and outer legs 46 and 48 define an E-type magnetic core which cooperates with the magneto magnet 16 and associated armature poles 18 and 20 to define a complete closed magnetic circuit. The two winding assemblies 38 and 40 are identical in every respect and are diametrically opposed. Each cooperates with the magnet 16 and poles 18 and 20 in an identical manner.

However, each is separately connected to one spark plug in the associated engine whereby spark timing and spark distribution are automatically obtained.

Without departing from the major features of the instant invention, one may employ a single magneto coil, such as coil 38, and utilize a distributor for two or more spark plugs in the conventional manner. Thus, in explaining the circuit diagram of FIG. 3, both coil assemblies 38 and 40 will be taken into account. However, in describing the timing and electric and magnetic operation of the circuit with reference to FIGS. 2 and 4–9, only the coil assembly 38 will be considered.

A trigger coil and core assembly 50 is also mounted on stator 12. The assembly 50 includes a single trigger coil 52 mounted on one leg 54 of a core which also includes a second leg 56 and a permanent magnet 58. The permanent magnets 16 and 58 may be made of any well-known high-retentivity high-permeability material, such as alnico 5. Also, if for any reason it would be considered desirable, either magnet 16 or 58 could be replaced by other sources of magnetic flux including an electromagnetic source if so desired. The use of an electromagnetic source introduces wiring and other complications which generally make such an adaptation undesirable.

The trigger core legs 54 and 56 are shaped to correspond to the outer annular periphery of the stator 12 and to cooperate with the armatures 30 and 32 to define a low reluctance magnetic path for the flux of magnet 58 whenever the armature poles 34 and 36 and magnet legs 54 and 56 are aligned. The winding assemblies 38 and 40 and the triggering coil 52 are connected by wiring 60 diagrammatically shown in FIG. 1. However, the actual wiring of the magneto assembly, trigger coil assembly, and control circuitry is as set forth in FIG. 3. The particular components of the control circuit may be incorporated within the stator 12 or may be located externally.

*The magneto circuit*

Referring now to FIG. 3, the entire circuit for the magneto system includes two magneto coil assemblies 38 and 40, a threshold circuit 61, "turn on" circuit 63, "turn off" circuit 65, and trigger circuit 67. The basic operation of the circuit is as follows: As armature poles 20 and 18 approach either of the magneto coil assemblies 38 or 40, voltage is generated therein which stores energy in the "turn on" circuit 63 and the "turn off" circuit 65. Thereafter, at predetermined times the circuit 63 renders the threshold circuit 61 conductive and subsequently the circuit 65, triggered by circuit 67 renders the threshold circuit non-conductive to prodce the substantial ignition impulse.

More specifically, the coil assemblies 38 and 40 are illustrated in the right-hand portion of the diagram and they include first windings 62 and 64 and second windings 66 and 68. Each second winding 66 and 68 is connected between a ground connection 70 and an associated spark plug diagrammatically illustrated by arrows 72. A sufficient voltage impulse in the second windings 66 or 68 will produce a breakdown of the spark gap and ignite the engine fuel in the well-known manner.

The first winding 62 has a capacitor 74 connected in parallel therewith and the parallel combination is connected to the cathode of a diode 76 and the anode of a diode 78. Similarly a capacitor 75 is connected across the first winding 64 and this combination is connected to the cathode of diode 120 and the anode of diode 86.

The rotation of rotor 10 carrying the associated magnet 16 and poles 18 and 20 generates a flux pattern within the central leg 42 of coil assembly 38, as illustrated by curve 28 in FIG. 2. At time, $T_0$, the relationship of the armature poles 18 and 20 is as shown in FIG. 4. Therein it can be seen that the enlarged leading pole 20 is beginning to cover the central leg 42 of core 44, while the trailing pole 18 is beginning to cover the leg 46 of core 44. Thus, magnet 16 produces gradually increasing flux in central leg 42 for rotation of the rotor in the direction indicated by arrow 22. The position of the rotor at time $T_1$ is illustrated in FIG. 5. At that time the pole 20 entirely covers the central leg 42 and the pole piece 18 covers somewhat more than half of the leg 46. Thus, at time $T_1$, the rate of change of flux is near its maximum and consequently the voltage generated in windings 62 and 66 forming a part of coil assembly 38 is at about its maximum negative value. The voltage in first winding 62 is illustrated by curve 80 in FIG. 2. The curve 80 is somewhat idealized and will depend substantially upon many variables in the circuit.

The position of the rotor at time $T_2$ is illustrated in FIG. 6, where the armature poles 20 and 18 fully cover the respective core legs 42 and 44 and thus the rate of change of magnetic flux is zero and the voltage in both the first and second windings 62 and 66 is also zero as illustrated by curve 80. Thereafter, as the rotor continues to move in the direction indicated by arrow 22, the armature poles 20 and 18 begin to move beyond complete coverage of core legs 42 and 46, as illustrated in FIG. 7. This produces reduced flux as shown at time $T_3$ in FIG. 2. The change in flux produces a positive voltage in both the first and the second windings as represented by curve 80.

Ignoring for the moment the operation of the balance of the circuit, the change of flux continues as the leading armature pole 20 begins to cover the last leg 48 of core 44, and the trailing pole 18 begins to cover central leg 42. This produces a reversal of flux direction in the central leg 42, as indicated in the curve 80 in FIG. 2 at time $T_4$ and based upon the position of the parts as illustrated in FIG. 8. FIG. 9 illustrates and relationship of the parts at time $T_5$ wherein the poles 20 and 18 of the armature substantially cover the respective poles 48 and 42 of core 44, whereby substantial flux in the reverse direction is produced in the central leg 42. As the armature continues to move, poles 20 and 18 completely cover legs 48 and 42 producing the maximum flux as shown at time $T_6$ in FIG. 2. Thereafter, the negative flux diminishes producing a negative voltage impulse as illustrated by curve segment 80c in FIG. 2.

During the cycle of magneto flux and voltage illustrated in curves 28 and 80 and carefully timed with the magnetoelectric phenomena already described, the trigger armature 32 is moving through its cycle with the trigger coil assembly 50. As shown in FIGS. 4 and 5, there is little coupling between the coil and armature at times $T_0$ and $T_1$. Consequently, there is little or no significant flux established in the trigger coil 52 at times $T_0$ and $T_1$. At time $T_2$, the leading pole 36 of the trigger armature assumes the position shown in FIG. 6, beyond the first leg 56 of the trigger core and flux begins to develop in the coil 52. This flux is illustrated by curve 82 in FIG. 2 and, as shown therein, the flux in the trigger coil approaches a maximum between time $T_3$ and time $T_4$. The position of the armature at these times is illustrated in FIGS. 7 and 8, respectivley. Thereafter, the flux diminishes and is insignificant before the time $T_6$ arrives.

In operation of the circuit, the negative change in flux occurring between the two humps in the flux curve 28 is utilized for spark generation. During this rapid flux change, there is a very substantial current in first coil 62, as shown by curve 81 in FIG. 2. For optimum ignition impulse it is desirable to open the circuit at a time when the first current through coil 62 is near the maximum such as at time $T_5$. The resulting rapid flux change will produce a very substantial voltage in second coil 66 and thus produce voltage breakdown across the spark gap 72 and consequent properly timed ignition.

The foregoing ignition sequence is assured through the employment of a solid state threshold device 84, in the threshold circuit 61. The term "solid state threshold device" or merely "threshold device," as those terms are used herein, mean any one of a plurality of solid state devices which are presently available and others which may become available for controlling the flow of current between an anode terminal and a cathode terminal or so-called "conductive terminals" by virtue of a threshold or avalanche characteristic initiated and terminated by a triggering signal applied to a so-called gate or "control terminal." Such devices are identified in various ways by the manufacturers who make them available and the term solid state threshold device is intended to encompass all such devices. While most of the devices satisfying this definition are four layer, three terminal devices, others, such as four and five layer, two terminal devices, may also be adapted to the invention.

Typical devices satisfying this definition are the PNPN silicon gate-controlled switches (GCS) sold by Texas Instruments Incorporated under the designation types TIC 11, 12, 13 and 15, so-called TOTCR types 241 UA–UM sold by Westinghouse Electric Corporation, and so-called Transwitches sold by Transitron Electronic Sales Corporation. The devices are all characterized in that they present a relatively high impedance to the flow of current between their conductive terminals (anode to cathode) until they are properly triggered by the application of current to the control terminal (gate). Thereafter, the impedance between the conductive terminals becomes very low and there is no significant linear control of the current flow by the application of signals to the control terminal. However, upon the application of a substantial reverse current to the control terminal, it is possible to render the device nonconductive and if held nonconductive for a period in the order of 100 microseconds, the device will remain nonconductive even after the control signal is removed.

One typical example of the operating characteristics of such a device is that of Transitron's Transwitch. In that device, the maximum forward and reverse currents at normal temperatures are about 10 microamperes. To turn the device "on" requires a positive signal of approximately 1 volt at the control terminal and a current of 15 milliamperes. Once the device is conductive, the control terminal is ineffective at the 1 volt level, the forward voltage across the device drops to about 2 volts, and the device is capable of conducting up to 5 amperes. To reverse the threshold phenomena and render the device nonconductive, a signal of opposite polarity must be applied to the control terminal. This signal must be up to −20 volts and provide a current up to 200 milliamperes. While such a control signal will stop current flow between the conductive terminals within a few microseconds, some control current must be maintained for approximately 100 microseconds to assure return of the quiescent or "off" condition. Thus, the energy required to turn the device off is substantially greater than the energy required to turn the device on.

The threshold device 84 has its anode connected to the cathodes of diodes 78 and 86 in the threshold circuit 61. The cathode of threshold device 84 is connected to ground. Thus, the voltage of first windings 62 and 64 is applied through diodes 78 and 86 to the anode of the threshold device 84. However, conduction does not occur therethrough until the appropriate signal is applied to the control terminal 88 in a manner to be described. A Zener diode 90 is connected across the threshold device 84 and protects the threshold device 84 from excessive surges of voltage from the windings 62 and 64 which might otherwise detrimentally affect the threshold device 84.

The operation of the circuit of FIG. 3 requires a triggering impulse for control terminal 88 both to initiate conduction and to terminate conduction through threshold device 84. The energy for these impulses is provided by the two supply circuits 63 and 65 which are energized from the primary windings 62 and 64 through diodes 76 and 120. During the initial negative voltage cycle illustrated by curve 80a in FIG. 2, current passes from winding 62 through diode 76 and from winding 64 through diode 120 to the grounded primary winding 94 of a three-winding transformer 92. One of the secondary windings 96 charges a grounded capacitor 98 through a current limiting resistor 100 and a diode 102. The diode 102 is poled so that the point 104 will exhibit a substantial positive charge. The charge will be limited by a Zener diode 106 which will also protect the circuitry against impulses and surges from the magneto system. In one particular embodiment of the invention, the capacitor 98 has a capacitance of 6.8 microfarads and the voltage thereacross is normally substantially the limiting value of the Zener diode 106, namely 18 volts.

The capacitor 98 is connected between ground and the anode of a silicon control rectifier (SCR) 108. An SCR is a threshold device which is gated by a control signal for conduction but is not capable of being rendered nonconductive by a control signal of opposite polarity. The cathode of SCR 108 is connected through a limiting resistor 110 and a conductor to the control terminal 88 of the threshold device 84. The cathode is also connected to the midpoint of series resistors 122 and 124 which form a voltage divider with either resistor 116 or 118. A capacitor 112 is connected in parallel with resistor 122 between the cathode and the control terminal of the SCR 108. Capacitor 112 prevents spurious activation of SCR 108 and provides energy storage to insure conduction at the prescribed time. The capacitance of capacitor 98 and the resistance of resistor 110 must be selected to provide a time constant sufficiently short to reduce the voltage applied to SCR 108 to the level where it will recover its nonconductive state.

The initial portions of the positive-going voltage in primaries 62 and 64 (curve 80b) are utilized to initiate conduction in SCR 108 at about time $T_3$. The positive-going impulse is applied through either resistor 116 or 118 to the control electrode of SCR 108. When the positive portion of the magneto voltage cycle rises to the level indicated at $T_3$, the voltage applied through resistors 116 or 118 to SCR 108 is sufficient to render the SCR conductive whereby current flows from capacitor 98 through the SCR 108 and resistor 110 to the control terminal 88 of threshold device 84. This renders the threshold device 84 conductive and the positive current from first winding 62 or 64 is thereafter bypassed through diode 78 or diode 86, respectively, and the threshold device 84 to ground. Thus, the first windings are effectively shorted during the time from $T_3$ to $T_5$. The voltage appearing across capacitance 98 is illustrated in FIG. 2 by curve 128 and this voltage goes substantially to zero when the SCR 108 becomes conductive.

In addition to charging capacitor 98, the negative segment 80a of the magneto signal also charges capacitor 130 from secondary winding 131 through current limiting resistor 132 and diode 134. In this "turn off" circuit 65, diode 134 is poled so that the voltage appearing across capacitor 130 is as indicated in FIG. 3. A Zener diode 136 is connected in parallel with capacitor 130 to eliminate transient impulses and limit the voltage appearing across capacitor 130. In one typical embodiment of this invention, capacitor 130 has a value of 3.3 microfarads and Zener diode 136 limits the voltage thereocross to 30 volts.

The energy stored in capacitor 130 is sufficient to render threshold device 84 nonconductive and is appropriately biased for this purpose, However, discharge of capacitor 130 through threshold device 84 is prevented by SCR 138 in trigger circuit 67. SCR 138 has its anode connected to the positive terminal of capacitor 130 and its cathode connected to ground. The bias resistor 140 is connected between the gate terminal of SCR 138 and ground and the trigger coil 52 is connected between ground and the gate terminal of SCR 138 through an appropriately poled diode 142. The positive half cycle of trigger voltage, as illustrated in FIG. 2 by curve 126, is applied from coil 52 through the diode 142 to the control terminal of SCR 138. SCR 138 is rendered conductive by the triggering pulse at time $T_5$ at which time the energy in capacitor 130 is rapidly dumped through the control terminal 88 of threshold device 84 to render that device nonconductive. The voltage appearing across capacitor 130 is diagrammatically shown by curve 131 in FIG. 2.

In this instance, the inherent characteristic of the magnetic structure tends to produce a substantial flux increase (pulse 28d in FIG. 2) tending to maintain the magneto current and substantially raising the voltage across the first winding 62 and the second winding 66. The voltage produced thereby is sufficient to render the spark gap conductive and thus produce a substantial current through the second winding.

The pulse from the second winding produces ignition of the vaporized fuel in the engine providing engine power. Thereafter, the system is conditioned for an additional cycle which normally will be provided by the alternate coil structure 40 with the alternate armature 30 activating the trigger circuit. It can readily be seen that the instant invention provides a solid state magneto system which is free of moving parts other than the rotating flywheel and is thus reliable and stable. There are no cams or rubbing surfaces to wear and alter timing and there are no breaker points to burn or deteriorate. The threshold device 84 acts as a controllable shunt for magneto current and can be rapidly rendered nonconductive in a step-function manner to produce a steep and effective transient voltage in both the first and second windings. This transient is sufficient to ignite the vaporized fuel in the conventional manner known in the magneto art.

The triggering circuit for the threshold device 84 includes two storage capacitors 98 and 130 which provide the necessary energy for rendering the threshold device 84 first conductive and then nonconductive. This energy is obtained in a unique manner from the magneto coil itself and utilizes so-called maverick signals which were heretofore considered undesirable and were suppressed. Spark initiation is uniquely produced by a triggering coil which is adjustable to control spark timing in a desirable manner. The stator 12 is adjustably mounted on the associated engine (not shown) for timing adjustment, and the trigger coil assembly 50 is mounted on a trigger frame 51 which is in turn adjustably mounted on stator 12. This adjusts the relationship between peak magneto current and the trigger impulse, or so-called "edge gap." Moreover, the timing of the spark may be dynamically advanced or retarded as desired and may be automatically advanced for increased engine speeds by virtue of the shape of the trigger coil voltage pulse curve 126. As the engine speed increases, the rate of flux change $d\phi/dt$ becomes greater and the voltage of the trigger coil increases. This will result in a slight timing advance at higher speeds which is highly desirable. It is also desirable that the magnets 16 and 50 be oppositely poled so that they do not interreact to become demagnetized as they pass during each cycle.

Without further elaboration, the foregoing will so fully explain the character of the invention that others may, by applying current knowledge, readily adapt the same for use under varying conditions of service, while retaining certain features which may properly be said to constitute the essential items of novelty involved, which items are intended to be defined and secured by the following claims.

What is claimed is:

1. In a magneto system including a magnetoelectric assembly having winding means and flux means, said winding means and said flux means being cyclically movable relative to one another in a flux linking relationship, the improvement comprising:

a solid state threshold device having a low impedance mode and conductive terminals providing a control terminal and terminals connected across said winding means to provide a low impedance path therefor in said mode;

trigger means mounted on said stator means and providing a timed electrical signal in response to movement of said rotor means; and storage circuit means for storing energy;

said trigger means connecting said storage circuit means to said control terminal at a predetermined time during each cycle of said rotor corresponding to said timed electrical signal to remove said threshold device from said low impedance mode and render said threshold device nonconductive;

a high voltage impulse being generated in said winding means in response to said timed electrical signal rendering said threshold device nonconductive.

2. A magneto system comprising:

a magnetoelectric assembly having magnetically coupled first winding means, second winding means and magneto flux means, said winding means and magneto flux means being cyclically movable relative to one another in a flux linking relationship;

a solid state threshold device having a low impedance mode and conductive terminals providing a control terminal and terminals connected across said first winding means to provide a low impedance path therefor in said mode;

trigger means mounted on said stator means and providing a timed electrical signal in response to movement of said rotor means; and storage circuit means for storing energy;

said triger means connecting said storage circuit means to said control terminal at a predetermined time during each cycle of said rotor corresponding to said timed electrical signal to remove said threshold device from said low impedance mode and render said threshold device nonconductive;

a high voltage impulse being generated in said second winding means in response to said timed electrical signal rendering said threshold device nonconductive.

3. The magneto system of claim 2 wherein said trigger means comprises a second flux means, an armature carried with said magneto flux means and a trigger coil carried with said first and second winding means, said armature and said second flux means being adapted to cooperate with said trigger coil for initiating a signal in said coil which controls said threshold device.

4. The magneto system of claim 2 wherein a second trigger means renders said threshold device conductive at a time in each cycle prior to said predetermined time.

5. The magneto system of claim 4 wherein the relative movement of said windings and flux means produces a first voltage excursion of one polarity and later voltage excursion of the opposite polarity, said system including means shorting said first winding means during said first voltage excursion, said second trigger means rendering said threshold device conductive only during the initial portion of said later excursion.

6. In a magneto system including stator means, rotor means cyclically movable relative to said stator means and a magnetoelectric assembly including armature means on said rotor means and magnetically coupled first and second winding means on said stator means, said armature means inducing voltages in said first and second winding means as said rotor means moves relative to said stator means, the improvement comprising:

a solid state threshold device having a low impedance mode and conductive terminals providing a control terminal and terminals connected across said first winding means;

storage circuit means for storing energy from said first winding means;

and trigger coil means mounted on said stator means and providing a timed electrical signal in response to movement of said rotor means, said trigger coil means producing an electrical connection between said storage circuit means and the control terminal of said threshold device to render said threshold device substantially nonconductive at a predetermined time during each cycle of said rotor, a high voltage impulse being generated in said second winding means in response to said timed electrical signal.

7. The magneto system of claim 6 wherein said trigger coil means provides timed electrical signals having a gradually increasing magnitude directly related to the rate of movement of said rotor means, said low impedance mode being terminated at earlier times in said cycle for increased rates of rotor movement.

8. The magneto system of claim 6 including circuit means connected to said threshold device to render said threshold device conductive at a known time early in said cycle compared to said predetermined time.

9. The magneto system of claim 6 wherein two storage circuit means are provided for storing energy from said first coil means, one of said storage circuit means being applied to said threshold device to render said device conductive in response to said voltage induced in said first coil means, and the other of said storage circuit means being applied to said threshold device in response to said signal from the trigger coil means at said predetermined time.

10. The magneto system of claim 9 wherein two diametrically opposed first and second winding means are mounted in said stator means to cooperate with said armature means, each of said first winding means being connected to the conductive terminals of said threshold device whereby high voltage impulses are alternately generated in said second windings in response to said timed electrical signal.

11. The magneto system of claim 6 wherein said magnetoelectric assembly includes:
two poled armature means and a flux source on said rotor means,
an E-shaped magnetic core having first, center and last legs and secured to said stator means,
said core cooperating with said armature means to provide low reluctance flux paths first between said first and center legs and subsequently between said center and last legs as said rotor moves through its cycle,
said first and second winding means coupled to said center leg to produce in each of said winding means a first voltage,
a second voltage of reversed polarity and a third voltage of the same polarity as said first voltage as said rotor moves through said cycle,
said solid state threshold device being poled for conduction in response to said second voltage.

12. The magneto system of claim 11 wherein storage circuit means is provided for storing energy from said first coil means, and wherein said first voltage charges said storage circuit means and said trigger coil means connects said storage circuit means to said threshold device at said predetermined time when said second voltage is produced in said first winding.

13. The magneto system of claim 12 including
first control means and second control means, said first control means activated by said cyclic movement and electrically connected to said threshold device to render said threshold device conductive for a predetermined time and said second control means suddenly rendering said threshold device nonconductive at a predetermined time during each cycle.
a high voltage impulse being generated in said second winding means in response to the rendering of said threshold device nonconductive.

14. The magneto system of claim 11 wherein a first and a second storage circuit means are provided for storing energy from said first coil means, said first voltage charging said first and said second storage circuit means, said second voltage discharging said first storage means through said threshold device to render said threshold device conductive, and said trigger coil means connecting said second storage circuit means to said threshold device at said predetermined time when said second voltage is at a predetermined point in said cycle.

15. The magneto system of claim 9 wherein a plurality of sets of first and second winding means are mounted on said stator means in spaced perimetric relationship with respect to said rotor means to cooperate with said armature means, each of said first winding means being connected to the conductive terminals of said threshold device whereby high voltage impulses are sequentially generated in said second windings in response to said timed electrical signal.

References Cited
UNITED STATES PATENTS

| | | | |
|---|---|---|---|
| 2,583,466 | 1/1952 | Brownlee | 310—153 |
| 3,051,870 | 8/1962 | Kirk | 315—177 |
| 3,186,397 | 6/1965 | Loudon | 123—148 |
| 3,229,162 | 1/1966 | Loudon | 315—218 X |
| 3,253,164 | 5/1966 | Konopa | 123—148 |
| 3,312,860 | 4/1967 | Sturm | 123—148 |

ORIS L. RADER, *Primary Examiner.*

H. HUBERFELD, *Assistant Examiner.*